United States Patent [19]

Ballé et al.

[11] Patent Number: 4,506,039

[45] Date of Patent: Mar. 19, 1985

[54] PROCESS FOR THE PRODUCTION OF POLYMER-CONTAINING AROMATIC POLYETHER POLYAMINES

[75] Inventors: Gerhard Ballé, Leverkusen; Werner Rasshofer, Cologne, both of Fed. Rep. of Germany; Winfried Schoberth, Pittsburgh, Pa.

[73] Assignee: Bayer Aktiengesellschaft, Leverkusen, Fed. Rep. of Germany

[21] Appl. No.: 450,813

[22] Filed: Dec. 20, 1982

[30] Foreign Application Priority Data

Jan. 2, 1982 [DE] Fed. Rep. of Germany ....... 3200021

[51] Int. Cl.$^3$ ..................... C08G 18/14; C08G 67/02
[52] U.S. Cl. .................... 521/137; 521/163; 525/131; 526/209; 528/75; 528/68; 528/372; 564/393; 564/394; 564/396; 564/397; 564/399; 564/402; 564/405; 564/408; 564/414; 564/412
[58] Field of Search ............ 528/392, 68, 75; 521/163, 137; 525/131; 526/209; 564/393, 394, 396, 397, 399, 402, 405, 408, 414, 412; 260/465 E

[56] References Cited

U.S. PATENT DOCUMENTS

| | | | |
|---|---|---|---|
| 4,130,542 | 12/1978 | Chang et al. | 528/67 X |
| 4,272,619 | 6/1981 | Balle et al. | 528/392 X |
| 4,286,074 | 8/1981 | Davis et al. | 528/392 X |
| 4,359,571 | 11/1982 | Bernstein et al. | 528/392 OR |

Primary Examiner—John Kight
Assistant Examiner—Garnette D. Draper
Attorney, Agent, or Firm—Gene Harsh; Joseph C. Gil; Lyndanne M. Whalen

[57] ABSTRACT

Polymer-containing polyether polyamines containing terminal aromatically-bound amino groups are produced by in situ polymerization of a polyether polyamine with an olefinically unsaturated monomer. The polyether polyamine starting material must have terminal aromatic amino groups, a molecular weight of from 800 to 10,000 and an aromatic amino group content of from 0.3 to 16 wt. %. Suitable olefinically unsaturated monomers include $\alpha,\beta$-unsaturated nitriles, aromatic vinyl compounds, $\alpha,\beta$-unsaturated carboxylic acids and esters thereof, vinyl esters, vinyl halides, vinylidene halides, $\alpha,\beta$-unsaturated carboxylic acid amides and aminoalkyl esters of unsaturated carboxylic acids. Acrylonitrile/styrene mixtures are preferred monomers. The starting materials are employed in quantities such that the product modified polyether polyamine contains from 1 to 60 wt. % polymer or graft-polymer. The product polyamines are particularly useful in the production of polyurethanes.

17 Claims, No Drawings

PROCESS FOR THE PRODUCTION OF POLYMER-CONTAINING AROMATIC POLYETHER POLYAMINES

BACKGROUND OF THE INVENTION

This invention relates to polymer-containing polyether polyamines containing terminal aromatically bound amino groups and a process for their production.

It is known that polyurethanes which have been produced using so-called polymer polyols (i.e. polyether polyols predominantly graft-modified by polymers or copolymers of olefinically unsaturated monomers) have better properties than non-modified polyether polyols. In particular, the hardness and carrying capacity of flexible polyurethane foams are better when modified polyether polyols are used. These modified polyether polyols are also advantageous in that they can be adjusted to relatively low unit weights and they save raw materials. In addition, such modified polymer polyols produce flexible foams having a greater number of open cells, and reduced shrinkage during storage. Finally, it is possible that use of such modified polymer polyols (provided the parent polyether is suitably selected) will produce highly elastic, cold-hardening foams without use of special polyisocyanates which have been specifically adapted with respect to reactivity. Standard commercial products, particularly the tolylene diisocyanate predominantly used in the manufacture of flexible foams, may, however, be used with modified polymer polyols.

In addition to polyether polyols, polyether polyamines have also been used as starting materials in the production of polyurethanes. Polyether polyamines may be obtained by any one of a number of processes, as will be discussed in more detail hereinafter. Polyether polyamines are generally characterized by greater reactivity and also by properties modified through the formation of urea groups instead of urethane groups upon reaction with polyisocyanates.

U.S. Pat. No. 4,286,074 describes polymer modification of polyethers containing terminal amino groups by grafting with unsaturated monomers. In this disclosed process, polyethers containing terminal amino groups, are said to be made by addition of the terminal hydroxyl groups of polyether polyols with acrylonitrile, followed by hydrogenation of the nitrile groups. The products described are polyethers containing terminal, primary aliphatically bound amino groups.

It is also known that OH-groups may readily be cyanoethylated on reaction with acrylonitrile. In fact, tests in which polyether polyamines containing aliphatically bound, primary terminal amino groups were treated with acrylonitrile and/or acrylonitrile/styrene mixtures under graft polymerization conditions have shown that cyanoethylation to form tertiary and secondary amino groups occurs to such a considerable extent that very few primary amino groups remain intact. It follows from this that the grafting of aliphatic polyether amines with acrylonitrile or with monomer mixtures containing acrylonitrile (particularly the acrylonitrile/styrene mixtures used exclusively in polymer polyol technology) results in a partial loss of functionality. Such grafted polyether polyamines are unsuitable for the production of polyurethane plastics because they may cause chain termination to a significant degree.

SUMMARY OF THE INVENTION

It is an object of the present invention to provide a process for the production of grafted polyether polyamines modified with vinyl monomers.

It is also an object of the present invention to provide a process for the production of grafted polyether polyamines modified with vinyl monomers which have a high functionality yet are very fluid and have a low viscosity.

It is another object of the present invention to provide grafted polyether polyamines which are particularly advantageous starting materials in the production of polyurethanes.

It is yet another object to provide grafted polyether polyamines which do not undergo cyanoethylation to any significant degree under graft polymerization conditions.

It is also an object of the present invention to provide grafted polyether polyamines modified with vinyl monomers which have a high functionality, high fluidity and low viscosity despite a high degree of grafting.

These and other objects which will be apparent to those skilled in the art are accomplished by reacting polyether polyamines containing aromatically bound primary terminal amino groups with olefinically unsaturated monomers (preferably acrylonitrile and styrene) under graft polymerization conditions.

DETAILED DESCRIPTION OF THE INVENTION

Attempts have been made to produce polyether polyamines containing polymers in dissolved, dispersed and/or grafted form by reacting "polymer polyols" (obtainable by in situ polymerization of vinyl monomers in polyether polyols) with an excess of polyisocyanate and converting the polymer-containing NCO-prepolymers thus obtained into polymer-containing polyether polyamines by alkaline hydrolysis with alkali hydroxides and releasing the amino groups from the carbamate groups formed. Such a process, may be carried out, for example, by reacting an NCO-functional prepolymer containing urethane groups of difunctional or polyfunctional polyoxyalkylene ether polyols having a molecular weight of from 1000 to 10,000 (preferably from 2000 to 6000) which contain from 1 to 60 wt. % (preferably from 5 to 40 wt. %) of polymers and/or copolymers of unsaturated monomers in grafted-on form and, optionally, other groups (such as urea, biuret and/or allophanate groups), and optionally low molecular weight chain-extending agents having molecular weights of from 18 to 400 and an excess of an organic diisocyanate. This NCO-functional prepolymer is reacted to form a polycarbamic acid salt by reaction with an aqueous-alkaline medium (optionally containing miscible organic solvents). The salts thus-obtained are then converted into the corresponding polymer-modified polyether polyamine containing urethane groups with elimination of carbon dioxide.

One disadvantage of the above-described process lies in the fact that the products obtained have a relatively high viscosity. In contrast to the non-grafted polymers or copolymers, of the type described in DE-A No. 29 48 419, U.S. Ser. No. 308,326 filed Oct. 5, 1981 and in German Patent Application Nos. P 30 35 639.9, P 31 31 256.7, P 31 29 978.4 and P 31 29 979.2, the products of the above-described process generally have a salve-like to paste-like consistency so that their processability using standard polyurethane technology is It has been found, however, that products combining considerably lower viscosity with better processability and more favorable reactivity to isocyanate compounds may be obtained if, polymer-free polyether-NCO-prepolymers (optionally containing urea, biuret, allophanate, isocyanurate, amide, ester and/or urethane groups) rather than polymer- and/or copolymer-modified polyether urethane-NCO-prepolymers of polymer-modified polyether polyols and excess polyisocyanates are converted by alkaline NCO-hydrolysis into the corresponding polyether polyamines, which polyamines are subsequently modified to form grafted-on polymers and/or copolymers by in situ polymerization of one or more unsaturated vinyl monomers.

The present invention provides an improved process for the production of polyether polyamines containing terminal aromatic amino groups. These polyether polyamines also contain polymers and/or copolymers of unsaturated compounds, preferably graft (co)polymers and, optionally, other bonds, such as urea, biuret, allophanate, isocyanurate, amide, ester and/or urethane groups.

In the process of the present invention polyether polyamines containing aromatic terminal amino groups are subjected to radical in situ polymerization with one or more ethylenically unsaturated monomers, preferably acrylonitrile/styrene mixtures. The present invention is not directed to modification of polyether polyamines containing aliphatically bound terminal amino groups by radical in situ polymerization.

More specifically, the present invention relates to a process for the production of relatively low-viscosity, readily processible, polymer-modified polyether polyamines containing terminal aromatic amino groups in which polyether polyamines containing terminal aromatic amino groups and having a molecular weight of from 800 to 10,000 and preferably from 1200 to 6000 are subjected to radical in situ polymerization with one or more olefinically unsaturated monomers (preferably acrylonitrile and/or styrene and optionally methacrylic acids or their alkyl esters). The starting components are used in quantities such that the polymer-modified aromatic polyether polyamine contains from 1 to 60 wt. %, preferably from 5 to 50 wt. % and, most preferably, from 10 to 40 wt. % of polymer or graft polymer. The present invention also relates to polymer-containing polyether polyamines having improved processability obtained by the above-described process. The (co)polymers may be in dissolved, dispersed and/or grafted form, preferably in grafted form.

The polyether polyamines containing terminal aromatically bound amino groups used as the starting component for the in situ polymerization reaction may be produced by various methods known to those skilled in the art.

For example, isatoic acid anhydride may be reacted with OH-functional polyethers to form o-aminobenzoic acid ester derivatives, as $CO_2$ is eliminated. (See, e.g. DE-A Nos. 20 19 432; 26 19 840; 26 48 774; 26 48 825 and 29 16 545 and U.S. Pat. No. 4,180,644). Reaction of nitrophenyl isocyanates or nitrobenzoic acids or nitrobenzoic acid esters with polyether polyols, followed by hydrogenation of the nitro groups, also yields polyether amines containing terminal aromatically bound amino groups (See German Pat. No. 1,495,763, Example 1, and U.S. Pat. No. 2,888,439).

Other processes based on the addition of isocyanato-azobenzene derivatives with polyether polyols, followed by reduction on the azo group to obtained aromatic amines, are described in French Pat. No. 1,474,551. DE-B No. 12 70 046 describes a process for the production of defined, primary aromatic amines containing polyalkylene glycol ether segments. In this disclosed process, reaction products of aromatic di- or triisocyanates with polyalkylene glycol ethers and/or polyalkylene glycol thioethers (preferably those having molecular weights of from 400 to 4000) are reacted with secondary or tertiary carbinols. The product of this reaction is subsequently subjected to thermal dissociation in an inert solvent (optionally in the presence of acid catalysts). According to Belgian Pat. No. 675,425, carbinol adducts of this type may also be split to form the corresponding amines in an acid-catalyzed reaction.

DE-B No. 16 94 152 discloses a process for the production of polyether amines containing at least two terminal amino groups in which NCO-prepolymers of a polyether polyol and excess polyisocyanates are reacted with aminophenyl ethyl amine or other araliphatic diamines having correspondingly adapted reactivity (NCO:NH-ratio=1:1.5 to 1:5). In this disclosed process, unreacted amine must be carefully removed in another step because the presence of unreacted amines generally leads to very short processing times and the amine itself acts as a reactant.

Another possible method in synthesizing polyamines containing urethane groups is described in French Pat. No. 1,415,317. In this disclosed process, NCO-prepolymers containing urethane groups are converted by reaction with formic acid into the N-formyl derivatives which are then hydrolyzed to form terminal aromatic amines. The reaction of NCO-prepolymers with sulfamic acid in accordance with DE-B No. 15 55 907 also produces compounds containing terminal amino groups. Other processes for the production of relatively high molecular weight compounds containing terminal amino groups are described in DE-B Nos. 11 22 254 and 11 38 220.

The reaction of unsaturated monomers with polyether polyamines containing terminal aliphatic amino groups or even hydrazide or semicarbazide groups is outside the scope of the present invention because these groups react undesirably with the monomers (especially, acrylonitrile) used in the present invention. The process described in DE-B No. 16 94 152, in which hydrazine is used as the excess diamine is one example of a process yielding compounds outside the scope of the present invention. Another example is the production of relatively high molecular weight prepolymers containing aliphatic, secondary and primary amino groups in accordance with DE-B No. 12, 15 373 by reacting relatively high molecular weight hydroxyl compounds with ammonia under pressure at elevated temperatures in the presence of a catalyst. In U.S. Pat. No. 3,044,989, relatively high molecular weight polyhydroxyl compounds are reacted with acrylonitrile and then catalytically hydrogenated to yield compounds outside the scope of the present invention. Relatively high molecular weight compounds containing terminal aliphatic amino groups which are not suitable for the process of the present invention can also be obtained by reacting NCO-prepolymers with aliphatic or cycloaliphatic enamines, aldimines or ketimines containing hydroxyl groups, and then hydrolyzing the product, in accordance with DE-A No. 25 42 536 or U.S. Pat. No. 3,865,791.

Particularly suitable for the practice of the present invention are polyether urethanes containing aromatic terminal amino groups obtained when NCO-prepolymers of polyethers and excess aromatic polyisocyanates are mixed with a slight excess of aqueous or aqueous/alcoholic alkali (alkaline earth) hydroxides and the alkali (alkaline earth) carbamates formed are converted with acids into the amine (salts). The amine may optionally be released from the salts by using alkali. NCO-prepolymers such as these contain urethane groups, although they may also contain other groups such as, urea and/or biuret and/or isocyanurate and/or carbodiimide and/or allophanate and/or uret dione groups in cases where corresponding isocyanates and optionally aromatic diamines containing such groups are useding during formation of the prepolymer or where the NCO-prepolymers are modified by reaction with water or aromatic diamines.

Applicants' U.S. Ser. No. 308,326 filed Oct. 5, 1981, now U.S. Pat. No. 4,386,218 describes an improved process for working up the carbamates obtained by hydrolysis of the NCO-polyether prepolymers (containing aromatic NCO-groups) with alkali hydroxides by the addition of acid ion exchangers. The aromatic polyamines are thereby made easier to obtain.

Applicants' unpublished German Patent Application No. P 31 31 252, describes a particularly advantageous process for working up the alkaline hydrolysis products of aromatic NCO-polyether prepolymers by subjecting the carbamate intermediate stage to simple thermal decomposition or to solvent extraction. The aromatic polyether polyamine may thus be isolated in a technically advantageous manner.

It is possible to obtain polymer-containing polyether polyamines containing aromatic terminal groups which are lower in viscosity and easier to work up during production of polyurethanes by the process of the present invention. These polyamines are also easier to measure out on a commercial scale and may be used with less difficulty as a synthesis component in the production of polyurethane ureas. It has also been found that use of the polymer-modified polyether polyamines of the present invention yields polyurethanes having advantageous properties (such as improved compression hardness), which are superior to those made from polymer-containing polyether polyamines produced by other methods which polyamines would appear to have the same composition as the polyamines of the present invention. (See Example 5 infra).

The difference in viscosity and the improved properties of polyurethane ureas produced from them clearly indicate that the polymer-modified polyether polyamines produced by the present invention are different from the polyamines made by alkaline hydrolysis of NCO-prepolymers based on polymer-modified polyether polyols despite the fact that the compositions appear to be the same. The exact reason for these differences is not known.

The advantageous structure of the polymer-modified polyether polyamines containing terminal aromatic amino groups obtained by the process of the present invention is surprising in that the terminal amino groups which were expected to interfere with the radical polymerization of the unsaturated monomers (because some aromatic amines are known to have a chain-terminating function) do not interfere with the polymerization to any significant extent.

The in situ polymerization of monomers in the polyether polyamines containing aromatically bound amino groups in accordance with the present invention yields dispersions or solutions of polymers or copolymers in the polyether polyamine used as substrate. A significant percentage of the polyether polyamine can be expected to be incorporated in the polymer through transfer reactions onto the polyether chains, so that the dispersed or dissolved polymer component should for the most part be considered a graft (co)polymer.

The polyether polyamines containing terminal aromatically bound amino groups used as starting materials in the in situ polymerization reaction should have a molecular weight of from about 800 to 10,000, preferably from 1200 to 7000 and, most preferably, from 2000 to 6000. These polyamines have an aromatic amino group content of from 0.3 to 16 wt. %, preferably from 0.45 to 10 wt. %, and most preferably, from 0.5 to 3.2 wt. %. The polyether polyamines produced in accordance with the present invention generally have a functionality of from about 1.9 to 8, preferably from 1.95 to 4 and, most preferably, from 2 to 3. These polyether amines containing aromatic amino groups may be produced by any of the processes described above. However, many of the known processes are complicated, expensive or involve considerable outlay. For example, catalytic reduction of nitro compounds, azo compounds and of nitrile groups is far from practical. The reaction of polyether-based NCO-prepolymers with carbinols, excess polyamines, formic acid, sulfamic acid, araliphatic polyamines and others requires intermediate stages and, consequently, increased financial outlay.

Preferred starting materials for the process of the present invention which are particularly easy to obtain are polyether polyamines containing aromatic amino groups which are produced by alkaline hydrolysis of NCO-prepolymers of polyether polyols, optionally low molecular weight chain-extending agents and excess aromatic polyisocyanates. (See for example, DE-A No. 29 48 819). Such polyamines which may be favorably worked up are particularly suitable for in situ graft polymerization. Depending upon the starting materials used and the procedure adopted for their production, the polyether polyamines used to produce the modified polyamines of the present invention may contain other groups such as urethane, urea, allophanate, biuret, isocyanurate, amide and/or ester groups, and other groups typically encountered in polyurethane chemistry. Other groups which may be present in the amine starting material include carbodiimide groups, uret dione groups, uretone imine groups and similar groups of the type which can be formed by further reaction of isocyanate groups or by modification of isocyanate groups. In virtually every case, however, the preferred polyether polyamines contain urethane groups and are produced by the reaction of the polyether polyols with excess quantities of polyisocyanates to form the NCO-prepolymers which are then converted into the polyether polyamines.

The polyethers employed in the production of polyether amines used in the practice of the present invention generally contain from 2 to 8, preferably from 2 to 4 and, most preferably, from 2 to 3 hydroxyl groups. Suitable polyethers are known to those skilled in the art. Such polyethers may be obtained, for example, by the polymerization of tetrahydrofuran or epoxides such as ethylene oxide, propylene oxide, butylene oxide, styrene oxide or epichlorohydrin or by the addition of these epoxides (preferably ethylene oxide and/or propylene oxide, optionally in admixture), in any ratio or in succession with starter components containing reactive hydrogen atoms. Such starter compounds include water, alcohols, ammonia and amines. Specific examples of starter compounds are ethylene glycol, propylene glycol, trimethylol propane, glycerol, sorbitol, cane sugar, dianhydrosorbitol, 4,4'-dihydroxy diphenyl propane, aniline, ethanolamine, diethanolamine, N-methyl diethanolamine, N-methyl diethanolamine and ethylene diamine. Sucrose polyethers and formitol- or formose-started polyethers may also be used. In many cases, it is preferred to use polyethers which contain predominantly primary OH-groups (up to 90 wt. %, based on all the OH-groups present in the polyether). It is also preferred to use polyalkylene oxide polyols based on ethylene oxide, propylene oxide and tetrahydrofuran, most preferably propylene oxide polyethers containing up to 50 mole percent of —$CH_2.CH_2.O$— units.

The molecular weight of the difunctional and higher polyether polyols is generally in the range of from about 800 to 10,000 and preferably in the range from 1200 to 6000. Their functionality is preferably between 2 and 3.

Low molecular weight compounds containing reactive hydrogen atoms (molecular weight: 18 to approximately 399) may optionally be used in small quantities in the reaction of the polyether polyols with the aromatic polyisocyanates to form the NCO-prepolymer. These compounds containing OH—, $NH_2$—, NH—, hydrazide- or SH-groups, which are also known as "chain-extending agents" may be used in quantities of less than 0.5 mole (preferably in quantities of from 0.01 to 0.2 mole) for each mole of polymer polyol. Suitable low molecular weight compounds of this type are water, diols (such as ethylene glycol, 1,2-propylene glycol, 2,3-butane diol and/or 1,4-butane diol, 2-methyl propane diol, neopentyl glycol), isophorone diamine, neopentyl diamine, 2,4- and/or 2,6-tolylene diamine or tetra-alkyl dicyclohexyl methane-2,4'- and/or -4,4'-diamines, polyethylene oxide, polypropylene oxide or polytetramethylene oxide diols having molecular weights below 399. Other urethane and/or urea groups, which also give allophanate or biuret groups when reacted with the polyisocyanates, may optionally be incorporated in the NCO-prepolymer by this modification.

Suitable polyisocyanates for the production of NCO-prepolymers from which aromatic polyamines are made include aromatic and heterocyclic polyisocyanates free from readily hydrolyzable groups (apart from the NCO-groups), of the type described in detail for example in DE-A No. 28 54 384, pages 8 to 11. It is preferred to use aromatic diisocyanates, such as 1,3- and 1,4-phenylene diisocyanate; 2,4- and/or 2,6-tolylene diisocyanate; diphenyl methane-4,4'-, -2,4'- and/or -2,2'-diisocyanate (including its mono- to tetra-alkyl and -chlorine-substituted derivatives) and naphthylene-1,5-diisocyanate. It is also possible to use polyisocyanates of higher functionality such as polyphenyl polymethylene polyisocyanates of the type obtained by condensing aniline with formaldehyde and then phosgenating and also polyisocyanates containing isocyanurate groups, urethane groups, acylated urea groups, allophanate groups, biuret groups or carbodiimide groups. Aromatic diisocyanates, such as the tolylene diisocyanates, diphenyl methane-4,4'-diisocyanates and 3,5-diethyl-3',5'-diisopropyl-4,4'-diisocyanate are particularly preferred. Tolylene-2,4-diisocyanate is the preferred commercial diisocyanate.

In addition to the above-mentioned compounds, it is also possible to use organofunctional polysiloxanes containing, for example, two hydroxyalkyl groups or polyacetals or polythioethers as the relatively high molecular weight compounds having the required molecular weights and functionalities indicated above for the polyether polyols suitable for purposes of the present invention.

The NCO-prepolymers containing free aromatic NCO-groups may be obtained by reacting the reactants in the melt or in solution in accordance with techniques known to those in the art. The equivalent ratio of NCO-groups to active hydrogen atoms (preferably OH-groups) should preferably be greater than 1 and most preferably between 1.5:1 and 2.8:1. It is of course possible to use an even larger excess of polyisocyanate. In general, the prepolymers have an oily to wax-like consistency, depending upon the starting components selected. If the NCO:OH ratio amounts to more than 2, substantially non-pre-extended NCO-prepolymers are obtained, whereas NCO/OH-ratios below 2 result in an increase in the average molecular weight of the prepolymers. If it is intended to obtain products having a very low content of monomeric polyamines, the NCO-prepolymers should be subjected to distillation to remove monomeric polyisocyanates (e.g. by a thin-layer evaporator). It is preferred to use NCO-prepolymers containing aromatically bound NCO-groups which have been produced from relatively high molecular weight polyether polyols (optionally using chain-extending agents of the type described above), and aromatic diisocyanates reacted in an NCO:OH equivalent ratio of from 1.5:1 to 2.8:1, most preferably from 1.5:1 to 2:1.

The NCO-prepolymers used generally have an NCO-content of from 0.5 to 30 wt. %, preferably from 1.2 to 25 wt. % aromatically bound NCO-groups. To convert the NCO-prepolymers into the polyamino compounds used as starting materials in the process of the present invention, the prepolymers are treated with a base. The prepolymers may be in the form of solutions but use of a solvent is not required. If a solvent is used, water-miscible solvents, such as dimethoxy ethane, diethylene glycol dimethyl ether, dioxane and tetrahydrofuran are preferred. Less suitable solvents are hydrocarbons, chlorinated hydrocarbons and also lower aromatic hydrocarbons. It is also possible to use secondary alcohols, such as isopropanol.

In the hydrolysis reaction of the NCO-groups to form the carbamate groups (or polyamines), difunctional or higher compounds, such as diprimary alcohols or aromatic diamines (for example 1,4-butane diol or 1,2-propylene glycol) may be used as solvents. The NCO-prepolymer may also be modified by the incorporation of these compounds.

The mixing of the NCO-prepolymers with the alkaline medium should ideally be carried out in a manner such that the temperature of the mixed reaction solution is maintained as low as possible in order to avoid the occurrence of secondary reactions as far as possible. The temperature prevailing in the reaction mixture of the components should be below 100° C., preferably below 70° C. and most preferably below 40° C. Accordingly, the temperature of the basic, low-viscosity medium should be as low as possible before being used in the reaction (for example in the range from −25° to +40° C.). The reaction mixture may, of course be cooled during the reaction. The appropriate reaction temperature is dependent upon the manner in which mixing and the actual reaction is carried out. The basic hydrolysis reaction is generally carried out using an aqueous solution or aqueous mixture of bases. The minimum quantity of water used in making the basic solution is that at which one mole of water is present for each mole of NCO.

Suitable bases are alkali hydroxides, alkaline-earth hydroxides, alkaline-earth oxides, low molecular weight alkali silicates and alkali aluminates, and organic ammonium hydroxides (for example tetra-alkyl ammonium hydroxides). Sodium and potassium hydroxides are particularly preferred. The bases may be used in concentrations of 1 part of base to 1–100 parts of water.

The reaction of the aromatic NCO-prepolymers with the bases may be carried out either continuously or in batches. The NCO-prepolymer may be slowly introduced into the basic medium, for example by dropwise addition or by injection through a nozzle. Uniform distribution of the NCO-prepolymer in the basic medium may be achieved by intensive stirring. The temperature limits may be maintained if necessary by cooling. In a commercial process, the NCO-prepolymers and the aqueous bases are delivered along separate paths to a common reaction zone where they are intensively mixed by means of a flow mixer and then rapidly discharged. In this process, the reaction components are generally delivered to the flow mixer at a temperature of from about −25° to +40° C., but the temperatures prevailing in the mixer may undergo a considerable increase.

The compounds containing carbamate groups obtained by mixing the NCO-compounds with the basic medium may be converted into the corresponding compounds containing aromatic amino groups by thermally decomposing the compounds containing carbamate groups into compounds containing aromatic amino groups. The amines may be separated off or isolated from the carbamate-containing solutions by solvent extraction. This process is particularly advantageous in cases where the NCO-heterolysis has been carried out with a stoichiometric or sub-stoichiometric quantity of base (based on aromatic NCO-groups). Where an excess of base is present in the hydrolysis stage, the base remaining may be removed by the addition of mineral acids or by using acid ion exchangers.

The polyether polyamines containing aromatically bound primary terminal amino groups, urethane groups and optionally other groups obtained in accordance with DE-A No. 29 48 419 and Applicants' own unpublished Patent Applications U.S. Ser. No. 308,326 filed Oct. 5, 1981 and German Patent Application Nos. P 30 35 639.9, P 31 31 252.7, P 31 29 978.4 and P 31 29 979.2 may be subjected to radical in situ polymerization with one or more ethylenically unsaturated monomers.

The olefinically unsaturated monomers which may be used in the process of the present invention include $\alpha,\beta$-unsaturated nitriles, aromatic compounds containing vinyl groups, $\alpha,\beta$-unsaturated mono- or polycarboxylic acids, esters of $\alpha,\beta$-unsaturated mono- or polycarboxylic acids with monohydric or polyhydric alcohols, vinyl esters, vinyl halides, vinylidene halides, $\alpha,\beta$-unsaturated carboxylic acid amides, amino alkyl esters of unsaturated mono- or polycarboxylic acids, hydroxy alkyl esters of $\alpha,\beta$-unsaturated mono- or polyhydroxy carboxylic acids or esters of vinyl phosphonic acids, optionally in the form of mixtures of various monomers.

Monomers suitable for the in situ polymerization reaction are vinyl compounds, such as styrene, vinyl toluene, vinyl acetate, vinyl propionate; acrylic and methacrylic compounds, such as acrylic or methacrylic acid, $C_1$–$C_{12}$-alkyl or cycloalkyl esters thereof, such as methyl methacrylate, ethyl acrylate, butyl acrylate, butyl methacrylate or cyclohexyl acrylate; $C_2$–$C_{12}$-hydroxy alkyl or $C_2$–$C_{12}$-hydroxy cyclohexyl esters, such as 2-hydroxypropyl acrylate, 4-hydroxy butyl acrylate or 2-hydroxy ethyl methacrylate; aminoalkyl esters, such as 2-N,N-di-methylaminoethyl methacrylate; acrylonitrile, methacrylonitrile, acrylamide or methacrylamide and derivatives thereof substituted on the nitrogen, such as N-methylol methacrylamide or N-butoxy methyl methacrylamide. Preferred unsaturated compounds are acrylonitrile, methacrylonitrile, styrene, $\alpha$-methyl styrene or vinyl toluene and optionally small quantities of $\alpha,\beta$-unsaturated mono- or polycarboxylic acids and/or alkyl esters thereof, or mixtures of the unsaturated compounds. The olefinically unsaturated monomers should generally be in quantities of from about 1 to 60 wt. % and, preferably, from 5 to 50 wt. % and, most preferably, from 10 to 40 wt. % (based on the reaction mixture as a whole).

It is particularly preferred to use mixtures of styrene and acrylonitrile in a ratio by weight of from 0:100 to 60:40 and most preferably in a ratio by weight of from 20:80 to 50:50.

Suitable initiators for the radical polymerization reaction are the organic peroxides and aliphatic azo compounds typically used as polymerization initiators, especially those having a thermal decomposition half life of at most 5 minutes at the polymerization temperature. Initiators of this type include benzoyl peroxide, lauroyl peroxide, tert.-butyl peroctoate, tert.-butyl perpivalate, dicyclohexyl peroxy dicarbonate and azoisobutyronitrile. It is advantageous to promote the grafting reaction as far as possible because the dispersion is stabilized by the polyether component incorporated in the polymer. It is best to use initiators which are capable of creating radical centers on the chain molecules of the polyether polyamines to a high degree (e.g. by removing a hydrogen atom). Initiators such as these include esters of peracids, such as tert.-butyl peroctoate, tert.-butyl perpivalate, or even azoisobutyronitrile which produce a high transfer level in this system.

In general, the polymerization reaction yields the required finely divided dispersions only at polymerization temperatures above 100° C. The reaction temperature range is generally limited at its upper end by the boiling points of the monomers and any solvents used. Favorable polymerization temperatures are in the range from 115° to 135° C., preferably from 120° to 130° C. Inert organic solvents may be used in relatively small quantities. A particularly suitable inert organic solvent is toluene because it may be readily distilled off from the product.

The reaction may also be carried out in the presence of special graft transfer agents of the type described in DE-A No. 28 37 026. According to DE-A No. 29 15 610, improved polymer polyols may be obtained by incorporating small quantities of ammonium salts of $\alpha,\beta$-unsaturated carboxylic acids which may have very high polymer contents despite relatively low viscosities. Incorporation of such ammonium salts may also be applied to the process of the present invention. Use of a small quantity of an α,β-unsaturated carboxylic acid as comonomer is capable of establishing an electrostatic interaction between the dispersed polymer component and some of the terminal amino groups of the substrate. This electrostatic interaction increases the stability of the resulting dispersion considerably and leads to the desired reduced viscosities of the polymer polyether polyamine. Incorporation of such ammonium salts makes it possible to produce polymer-modified polyether amines containing from 1 to 60 wt. %. Polymer contents of from 5 to 50 wt. % are preferred, and polymer contents of from 10 to 40 wt. % are most preferred.

The process of the present invention may be carried out either continuously or in batches. For example, a mixture containing the monomer(s), the initiator and optionally, part of the polyether polyamine to be modified may be introduced into the aromatic polyether polyamine which has been preheated to the polymerization temperature in a stirrer-equipped reactor. Alternatively, a mixture of all the reactants may be continuously pumped into a reactor and the product removed through an overflow. In the case of relatively large semi-industrial batches, it is advisable (due to the possibility of premature initiation of polymerization in the monomer mixture to be produced) to deliver the initiator in solution to the stream of monomers just before that stream enters the reaction zone (optionally through a mixer), or to introduce this solution into the reactor separately.

By virtue of their low vapor pressure, their relatively low viscosity and their favorable reactivity, the polymer polyether polyamine produced by the process of the present invention from unmodified polyether polyamines containing aromatic terminal amino groups by in situ polymerization of monomers are particularly useful as reactants in the production of polyurethane plastics. The polyamines modified in accordance with the present invention may be combined with other relatively low molecular weight (molecular weight: approximately 32 to 399) and/or relatively high molecular weight (molecular weight: approximately 400 to 15,000) compounds containing isocyanate-reactive groups when used in the production of urethanes. The modified polyamines produced in accordance with the present invention are particularly suitable for polyurethane-based high-frequency-weldable flexible foam plastics. The polyamines produced in accordance with the present invention may also be used as hardeners for epoxide and phenolic resins, as reactants in any known reaction involving amines, such as amide- or polyamide-forming reactions, and as coupling components for diazo dyes.

The polymer polyether polyamines containing aromatic amino groups produced in accordance with the present invention may be used advantageously in the production of non-cellular and/or cellular polyurethane plastics, elastomers and foams. Such polyurethanes are made by reacting the modified polyamines of the present invention with the usual starting materials for polyurethanes in known manner. (See, for example, DE-A Nos. 23 02 564; 24 32 764; 25 12 385; 25 13 815; 35 50 796; 25 50 797; 25 50 833; 25 50 860; 25 50 862 and 26 39 083).

Accordingly, the present invention also relates to the use of the polymer polyether polyamines containing aromatic amino groups obtained by the process of the present invention as synthesis components in the production of non-cellular and/or cellular polyurethane plastics, elastomers and foams. More specifically polyisocyanates are reacted with the modified polyamines produced by the present invention and, optionally, other low molecular weight and/or relatively high molecular weight compounds containing isocyanate-reactive groups, optionally in the presence of auxiliaries and additives known to those skilled in the art.

The isocyanates described above as useful in the production of NCO-prepolymers may also be used as starting materials for production of polyurethanes. Additional examples of polyisocyanates useful in the production of polyurethanes are aliphatic, cycloaliphatic, araliphatic polyisocyanates and polyisocyanates which have been modified as described in detail on pages 8 through 11 of DE-A No. 28 54 384.

Compounds containing at least two isocyanate-reactive hydrogen atoms and having a molecular weight of generally from 62 to 10,000 are normally used as the low molecular weight and/or relatively high molecular weight compounds containing isocyanate-reactive groups (so-called "active-H-groups") in the production of polyurethanes. Compounds containing hydroxyl groups, more particularly from 2 to 8 hydroxyl groups, especially those having a molecular weight of from 400 to 8000 (preferably from 600 to 6000) are preferably the predominant quantity isocyanate-reactive hydrogen containing compounds. Examples of such compounds are polyesters, polyethers, polythioethers, polyacetals, polycarbonates, and polyester amides and mixtures thereof, which generally contain from 2 to 8 (but preferably from 2 to 4) hydroxyl groups, of the type known to be useful in the production of non-cellular and cellular polyurethanes. These hydroxyl group-containing compounds may be combined with other low molecular weight polyfunctional compounds, such as polyols, polyamines or polyhydrazides, preferably polyols having molecular weights of from about 62 to 399 in order to modify the properties of the polyurethanes. A detailed list of suitable polyhydroxyl compounds can be found on pages 11 to 21 of German Offenlegungsschrift No. 28 54 384.

Other compounds normally referred to as chain-extending agents or crosslinking agents may also be used in producing polyurethanes from the modified polyamines obtained by the process of the present invention. These chain-extending and crosslinking agents have molecular weights of from 62 to about 399 and contain from 2 to 8, preferably from 2 to 4 (in the case of linear compounds, preferably 2) isocyanate-reactive hydrogen atoms, particularly hydroxyl groups. Examples of such compounds are ethylene glycol; 2,3-butane diol; 1,4-butane diol, neopentyl glycol; 2-methyl-1,3-propane diol; trimethylol propane; pentaerythritol; quinitol; sorbitol; 4,4'-dihydroxy diphenyl propane; dihydroxy ethyl hydroquinone; ethanolamine; diethanolamine; N-methyl diethanolamine; N-tert.-butyl-di-(β-hydroxypropylamine)-triethanolamine; 3-aminopropanol and mixtures thereof. Further examples of compounds such as these are found on pages 20 to 26 of DE-A No. 28 54 384. In addition, isocyanate-monofunctional compounds may be employed as so-called chain terminators. When used, these chain terminators are used in quantities of from 0.01 to 5 wt. % (based on polyurethane solids). Examples of such chain terminators are monoamines, monoalcohols and monohydrazide compounds. Catalysts known to be useful in the production of polyurethanes may optionally be used in the present invention. These catalysts may also be used in the form of mixtures. Examples of such catalysts are tertiary amines, organometallic compounds (particularly 1,4-diazabicyclo-(2,2,2)-octane) or tin-(II)- or tin-(IV)compounds.

Auxiliaries and additives which may be used in the production of polyurethanes include inorganic or organic blowing agents (for example, methylene chloride, monofluorotrichloromethane, dichlorodifluoromethane, also air, carbon dioxide or oxides of nitrogen); surface-active additives, such as emulsifiers or foam initiators or foam stabilizers; reaction retarders, cell regulators, pigments or dyes and/or flameproofing agents; stabilizers against the effects of ageing, light and weather; plasticizers, fungistatic or bacteriostatic agents and fillers. Information on suitable auxiliaries and additives can be found on pages 26 through 31 of DE-A No. 28 54 384 and in the literature references cited therein. Foams may be produced in the usual way both as free foams and also as molded foams. Foams may also be produced by block foaming or by known laminator processes or by any other foam production process known to those in the art.

Elastomers may be produced by casting, centrifugal casting or spraying processes by mixing the components manually or mechanically. Appropriate techniques are known to those in the art.

The polymer polyether amines containing terminal aromatic amino groups produced by the process of the present invention are preferably mixed with other relatively high molecular weight polyols or chain-extending agents and used in the form of a mixture on the "polyol metering side" when making polyurethanes. Polyurethanes made in this manner have particularly good heat stability and are characterized by increased modulus and improved resistance to hot water. It has been found that the polymer polyether polyamines produced in accordance with the invention have superior properties to polymer polyether polyamines produced by other methods.

The process of the present invention is illustrated by the following Examples in which the quantities given represent parts by weight or percentages by weight, unless otherwise indicated. The following names are used in the Examples:

AMINOPOLYETHER I

This product was produced as follows (by the process according to U.S. Ser. No. 308,326, filed Oct. 5, 1980): 1 mole of a linear polyoxy propylene ether diol having a molecular weight of 2000 and an OH-number of 56 was dehydrated in vacuo at 80° C. and then added dropwise at that temperature to 2 moles of 2,4-diisocyanatotoluene. The dropwise addition took 5 hours and was followed by stirring for 1.5 hours, after which the NCO-group content amounted to 3.3% (theoretical 3.58%). The product (dissolved in the same quantity by weight of dioxane) was introduced dropwise over a period of 5 hours at 10° C. into a solution of 2.02 moles of potassium hydroxide (1% excess) in 590 ml of water. After brief stirring to complete the reaction, 990 g of an acid anion exchanger resin having a grain size of less 0.2 mm (Levasorb ®A10, a product of Bayer AG) were added to the solution in portions over a period of 1 hour. 35.8 liters (approximately 86.6% of theoretical) of carbon dioxide were given off. After suction, filtration and washing (with dioxane) of the exchanger, the solvent was distilled off, leaving behind a polyether diamine having the following properties (2090 g ≙ 91.5% of theoretical).
Molecular weight: approximately 2500
Functionality: 2
Amine number: 40.2
Acid number: 0.1
Viscosity: 404 mPas/75° C.

AMINOPOLYETHER II

This polyether was produced in the same way as Aminopolyether I with the exception that a polyether triol having a molecular weight of 6000 (synthesized from oxypropylene and oxyethylene units having a primary OH-group content of more than 70 equivalent percent) was reacted with 3 moles of tolylene diisocyanate and subjected to alkaline hydrolysis to form the carbamate. The carbamate was decomposed to form the amine using an acid anion exchanger resin. The properties of Aminopolyether II were as follows:
Amine number: 22.1
Acid number: 0.5
Functionality: 3
Viscosity: 3500 mPas/40° C.

AMINOPOLYETHER III

This polyamine was produced in the same manner as was Aminopolyether I from a poly(oxypropyleneoxyethylene) block polyether diol having a molecular weight of 4000 which contained more than 70 equivalent percent primary OH-groups and 2 moles of tolylene diisocyanate. The properties of Aminopolyether III were as follows:
Amine number: 18.1
Acid number: 0.2
Functionality: 2
Viscosity: 1320 mPas/75° C.

AMINOPOLYETHER IV

This polyamine was produced from a poly(oxypropylene-co-oxyethylene)-block polyether triol having a molecular weight of 4800 and a primary OH-group content of more than 70 equivalent percent, 3 moles of tolylene diisocyanate, alkaline hydrolysis and decomposition to form the amine using an acid ion exchanger resin in the manner described for Aminopolyether I. The properties of Aminopolyether IV were as follows:
Amine number: 25.4
Acid number: <0.05
Functionality: 3
Viscosity: 739 mPas/75° C.

POLYMER POLYOL I

This polyol was the product of the in situ polymerization of styrene and acrylonitrile in a ratio of 40:60 in a linear polypropylene glycol having a molecular weight of 2000. This polyol had the following properties:
Polymer content: 14.6 wt. %
OH-number: 47.5
Acid number: 0.15
Viscosity: 2100 mPas/23° C.

POLYMER POLYOL II

This polyol which was similar to Polymer Polyol I was based on a poly-(oxypropyleneoxyethylene)-block polyether triol having a molecular weight of 6000 and a primary OH-group content of at least 70 equivalent percent. Polymer Polyol II had the following properties:

Polymer content: 16.0 wt. %
OH-number: 23.2
Acid number: 0.2
Viscosity: 1850 mPas/23° C.

POLYMER POLYOL III

This polyol which was similar to Polymer Polyol I was based on a linear poly-(oxypropyleneoxyethylene)-block copolyether diol having a molecular weight of 4000 and contained predominantly primary terminal OH-groups. Polymer Polyol III had the following properties:
Polymer content: 15.4 wt. %
OH-number: 23.8
Acid number: 0.15
Viscosity: 1620 mPas/23° C.

POLYMER POLYOL IV

This polyol which was similar to Polymer Polyol I was based on a poly-(oxypropylene-co-oxyethylene)-block copolyether triol having a molecular weight of 4800 and a primary OH group content of more than 70 equivalent percent. Polymer Polyol IV had the following properties:
Polymer content: 14.6 wt %
OH-number: 29.6
Acid number: 0.1
Viscosity: 1484 mPas/23° C.

EXAMPLES

EXAMPLE 1

200 g of Aminopolyether I were mixed with 50 g of toluene and the resulting mixture was introduced into a stirrer-equipped vessel provided with a reflux condenser, a gas inlet pipe and a dropping funnel. The reactor was purged with nitrogen, after which its contents were heated with stirring to 120° C. A mixture of 650 g of the same amino-polyether, 60 g of styrene, 90 g of acrylonitrile, 1.5 g of azoisobutyronitrile and 200 g of toluene was then added dropwise over a period of 5 hours during which a nitrogen atmosphere was maintained. A yellowish opaque dispersion was formed. This dispersion was freed from residual monomer and from the solvent by stripping in an oil pump vacuum at 100° to 120° C. The composition of the product was calculated from the gas-chromatographic analysis of the distillate collected. The product had the following characteristic data:
Polymer content: 13.8 wt. %
Acrylonitrile, bound: 7.8 wt. %
Styrene, bound: 6.0 wt. %
Aminopolyether: 86.2 wt. %
Monomer conversion: 90.7 wt. %
Amine number: 35.1
Viscosity: 29,000 mPas/23° C. 580 mPas/70° C.
Base nitrogen: 0.82 wt. %
Tert. N: <0.01 wt. %
Sec. N: 0.03 wt. %

COMPARISON EXAMPLE 1

For comparison, Polymer Polyol I (based on the same polypropylene ether diol having a molecular weight of 2000 as the aminopolyether used in Example 1) was converted into the polymer-modified aminopolyether by the process described above in reference to production of Aminopolyether I. 1 mole of Polymer Polyol I (apparent molecular weight 2360) was reacted with 2 moles of tolylene diisocyanate (2,4-isomer). The prepolymer was hydrolyzed to form the carbamate and the carbamate was decomposed to form the free amine. The resulting polymer-modified highly viscous polyether diamine was characterized by the following data:
Polymer content: 13.4 wt. %
Amine number: 36.5
Viscosity: 300,000 mPas/40° C.

EXAMPLES 2 TO 4

Aminopolyethers II, III and IV were subjected to in situ polymerization with styrene and acrylonitrile as described in Example 1. The characteristic data of the resulting products are set out in the following Table:

| Example No. | 2 | 3 | 4 |
| --- | --- | --- | --- |
| Aminopolyether | II | III | IV |
| Polymer content (%) | 12.7 | 13.0 | 14.2 |
| Acrylonitrile, bound (%) | 7.0 | 7.2 | 7.9 |
| Styrene, bound (%) | 5.7 | 5.8 | 6.3 |
| Aminopolyether (%) | 87.3 | 87.0 | 85.8 |
| Monomer conversion (%) | 19.5 | 15.7 | 22.8 |
| Amine number (mg of KOH/g) | | | |
| Viscosity (mPas/23° C.) | 19000 | 24000 | 20500 |
| Base nitrogen (%) | 0.38 | 0.34 | 0.47 |
| Tert.-N (%) | <0.01 | 0.01 | <0.01 |

COMPARISON EXAMPLES 2–4

As in Comparison Example 1, Polymer Polyols II, III and IV (which corresponded to Aminopolyethers II, III and IV with respect to the parent polyol) were each converted into a polymer-modified aminopolyether. These aminopolyethers were characterized by the data set out in the following Table. Comparison of the polymer-modified aminopolyethers thus obtained with the polymer-modified aminopolyethers produced in accordance with the present invention shows that the polymer-modified aminopolyethers produced in accordance with the present invention are distinguished by a considerably lower viscosity. This lower viscosity makes the polyethers easier to process in conventional polyurethane mixing and processing units.

| Comparison Example No. | 2 | 3 | 4 |
| --- | --- | --- | --- |
| Polymer Polyol | II | III | IV |
| Polymer content (%) | 15.1 | 14.5 | 13.9 |
| Amine number (mg of KOH/g) | 19.4 | 20.1 | 25.8 |
| Viscosity (mPas/23° C.) | Could not be measured; all the products have a paste-like consistency | | |

EXAMPLE 5 (Comparison Example)

100 g of a polyether triamine containing aliphatically bound primary terminal amino groups (obtained by reacting a polyoxypropylene-oxyethylene block copolyether triol containing predominantly primary terminal OH-groups and having a molecular weight of 6000 with ammonia under pressure) were boiled under reflux for 1 hour with 50 g of acrylonitrile. The acrylonitrile was then completely distilled off.

The product contained 0.47% of total base nitrogen of which 0.01% was primary N, 0.3% secondary N and 0.16% tertiary N. In other words, approximately one third of all the amino groups were substituted twice by cyanoethyl groups and were no longer available for polyaddition reactions.

EXAMPLE 6

In the following series of tests, the polyethers identified below were successfully converted into flexible foams under substantially identical conditions. The polyethers employed were:

(a) the polymer-modified aminopolyether of Example 2 (product according to the invention);

(b) the polymer modified aminopolyether of Comparison Example 2 which does not correspond to the invention; and (c) the polyether triol on which the two above-mentioned products were based and which is a trimethylolpropane-started poly-(propylene oxide-ethylene oxide)-block copolyether triol having a molecular weight of 6000, a hydroxyl number of 28 and a primary OH-group content of more than 70% of the total hydroxyl content.

The polyethers were stirred with water and foaming aids in the quantities indicated in the following Table. The isocyanate was then added and the mixture was poured after intensive stirring into a rectangular paper mold. The quantities indicated are in parts by weight. The gross density and compression hardness of the resulting foams were determined.

| Test No. | a | b | c |
|---|---|---|---|
| Prod. of Example 2 | 25 | — | — |
| Aminopolyether II | — | 25 | — |
| Polyether triol | 75 | 75 | 100 |
| Water | 3 | 3 | 3 |
| Dabco ® 33 LV[1] | 0.8 | 0.8 | 0.8 |
| Catalyst ® A-1[2] | 0.1 | 0.1 | 0.1 |
| Silicone stabilizer[3] | 0.2 | 0.3 | 0.2 |
| Polyisocyanate[4] | 51 | 51 | 52 |
| NCO:OH-index | 100 | 100 | 100 |
| Gross density (kg/m$^3$) according to DIN 53420 | 46 | 43 | 45 |
| Compression hardness at 40% deformation (kPa) according to DIN 53577 | 8.6 | 7.0 | 6.0 |

[1]A standard commercial foaming catalyst manufactured by Messrs. Air Products and Chemicals Inc. (triethylene diamine in the form of a 33% solution in dipropylene glycol).
[2]A standard commercial foaming catalyst manufactured by the UCC Company (dimethylaminoether).
[3]A polyether polysiloxane block copolymer; a product of Bayer AG.
[4]A diphenyl methane diisocyanate mixture consisting of monomeric diphenyl methane diisocyanates and polynuclear polymethylene polyphenyl isocyanates characterized by a binuclear content of 80 wt. % and a 2,4'-isomer content of 20 wt. %; an experimental product of Bayer AG.

It can be seen from the data presented in the Table above that even when 25% of the polyol component was replaced by a polymer-modified aminopolyether, a distinct increase in compression hardness was obtained. The product made from the polyamine of Example 2 (in accordance with the present invention) was clearly superior to that made with the analogous, non-polymer-modified Aminopolyether II (even after allowing for the differences in unit weight).

EXAMPLE 7

Production of polyurethane urea elastomers

Cast elastomers were produced from the following reaction mixtures:

| | A | B | C |
|---|---|---|---|
| Polyether prepolymer[1] | 100 | 100 | 100 |
| Product of Example 1 | 39.6 | — | — |
| Product of Example 3 | — | 83.1 | — |
| Chain extender[2] | 9.9 | 9.5 | — |
| Polymer polyol system[3] | — | — | 70 |

[1]Prepolymer produced by reacting a polypropylene glycol having a molecular weight of 1500 with excess 2,4-diisocyanatotoluene; the NCO-group content amounted to 5.2%.
[2]4-chloro-3,5-diaminobenzoic acid isobutyl ester
[3]A mixture of 90 parts by weight of Polymer Polyol IV and 10 parts by weight of a mixture of isomeric diamino-diethyl toluenes.

In preparing the casting mixtures, the prepolymer was briefly degassed in vacuo at 100° C. The chain extender and, optionally, the polymer-modified aminopolyether were then mixed in with intensive stirring. The mixing time amounted to 30 seconds. After tempering for 24 hours at 110° C., the hardened test specimens were tested for their mechanical properties. The following results were obtained.

| | A | B | C |
|---|---|---|---|
| Shore hardness A/D (DIN 53505) | 78/27 | 69/10 | 63/18 |
| Modulus at 100% elongation (mPa; DIN 53504) | 4.1 | 2.5 | 2.4 |
| Modulus at 300% elongation (mPa; DIN 53504) | 7.0 | 4.7 | 5.5 |
| Modulus of rupture (mPa; DIN 53504) | 12.3 | 6.6 | 7.4 |
| Breaking elongation (%; DIN 53504) | 507 | 413 | 364 |
| Tear propagation resistance (KN/m; DIN 53515) | 21 | 13 | 12 |
| Compression set (%; DIN 53517) | | | |
| 70 h/22° C. | 20.9 | 17.8 | 28.5 |
| 24 h/70° C. | 38.5 | 28.1 | 38.2 |

EXAMPLE 8

An NCO-prepolymer having an isocyanate group content of 3.4% was produced from a polyethylene butylene adipate diol having a molecular weight of 2000 and a mixture of isomeric diisocyanatotoluenes (80 wt. % of 2,4- and 20 wt. % of 2,6-diisocyanatotoluene). 100 parts by weight of this prepolymer were mixed with 30 parts by weight of the polymer-modified aminopolyether of Example 1 and 6.5 parts by weight of the chain-extending agent used in Example 6. Test specimens cast from this mixture had the following mechanical properties (Test Standards as indicated in Example 6):

Shore hardness A/D: 75/24
Modulus at 100% elongation 3.3 mPa at 300% elongation 5.4 mPa
Modulus of rupture: 26.0 mPa
Breaking elongation: 657%
Tear propagation resistance: 26 KN/m
Compression set 70 h/22° C. 20.9% 24 h/70° C. 33.1%

EXAMPLE 9

(Comparison Example)

The procedure used in Example 1 was repeated with the exception that the starting material used was not Aminopolyether I, but instead a polyoxypropylene ether diamine containing primary aliphatic terminal amino groups and having a molecular weight of 2000 which is marketed by the Jefferson Chemical Company under the name of Jeffamine ®D2000. This diamine had the following structural features:

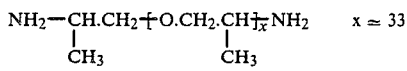

A polymer polyether polyamine containing aliphatic amino groups and having the following properties was obtained:
Polymer content: 14.3 wt. %
Acrylonitrile, bound: 8.0 wt. %
Styrene, bound: 6.3 wt. %
Aminopolyether: 85.7 wt. %
Monomer conversion: 94.5 wt. %
Amine number as determined by acetylation: 39.2 (calculated 48.6)
Viscosity at 25° C.: 2850 mPas
Total base nitrogen: 1.07% (calculated 1.15%)
Tertiary base nitrogen: 0.13%

This product was used instead of the product of Example 1 in the formulation specified in Example 7 (A). It was not possible to obtain test specimens that could be removed without being damaged from the molds used. The products had a tacky surface and a friable wax-like consistency. It was not possible to measure their mechanical properties.

What is claimed is:

1. A process for the production of relatively low-viscosity modified polyether polyamines containing terminal amino groups in which a polyether polyamine having terminal amino aromatic groups, a molecular weight of from 800 to 10,000 and an aromatic amino group content of from 0.3 to 16 wt. % is subjected to radical in situ polymerization with an olefinically unsaturated monomer.

2. The process of claim 1, wherein the polyamine and the monomer are employed in quantities such that the polymer-modified polyether polyamine contains as total polymer or graft polymer content from 1 to 60 wt.%.

3. The process of claim 1 wherein the monomer is selected from the group consisting of $\alpha,\beta$-unsaturated nitriles, aromatic vinyl compounds, $\alpha,\beta$-unsaturated carboxylic acids, esters of an $\alpha,\beta$-unsaturated carboxylic acid with alcohol, vinyl esters, vinyl halides, vinylidene halides, $\alpha,\beta$-unsaturated carboxylic acid amides, aminoalkyl esters of unsaturated carboxylic acids, hydroxyalkyl esters of $\alpha,\beta$-unsaturated hydroxy carboxylic acids, esters of vinyl phosphonic acids and mixtures thereof.

4. The process of claim 1 wherein the monomer is selected from the group consisting of acrylonitrile, methacrylonitrile, styrene, $\alpha$-methyl styrene, vinyl toluene and mixtures thereof.

5. The process of claim 4 wherein a small quantity of $\alpha,\beta$-unsaturated carboxylic acids, an alkyl ester or mixtures thereof is also used.

6. The process of claim 2 wherein the monomer is selected from the group consisting of acrylonitrile, methacrylonitrile, styrene, -methyl styrene, vinyl toluene and mixtures thereof.

7. The process of claim 6 wherein a small quantity of $\alpha,\beta$-unsaturated carboxylic acid, an alkyl ester thereof or a mixture there is included in the monomer.

8. The process of claim 1 wherein an organic peroxide or an aliphatic azo compound is used to initiate polymerization.

9. The process of claim 2 wherein an organic peroxide or an aliphatic azo compound is used to initiate polymerization.

10. The process of claim 8 wherein the compound used to initiate polymerization is selected from the group consisting of tertiary butyl perpivalate, tertiary butyl peroctoate, tertiary butyl perbenzoate, azoisobutyronitrile and mixtures thereof.

11. The process of claim 9 wherein the compound used to initiate polymerization is selected from the group consisting of tertiary butyl perpivalate, tertiary butyl peroctoate, tertiary butyl perbenzoate, azoisobutyronitrile and mixtures thereof.

12. The process of claim 1 wherein the polyether polyamine containing terminal aromatic amino groups is one obtained by hydrolysis in a pH basic environment of an NCO-prepolymer of a relatively high molecular weight polyether polyol, optionally a chain extending agent, and excess aromatic polyisocyanate.

13. The process of claim 2 wherein the polyether polyamine containing terminal aromatic amino groups is one obtained by hydrolysis in a pH basic environment of an NCO-prepolymer of a relatively high molecular weight polyether polyol, optionally a chain extending agent and excess aromatic polyisocyanate.

14. The process of claim 1 wherein the in situ polymerization is conducted in the presence of a catalyst.

15. The process of claim 2 wherein the in situ polymerization is conducted in the presence of a catalyst.

16. A cellular polyurethane produced from the polymer-modified polyether polyamine containing terminal aromatic amino groups produced by the process of claim 1.

17. A cellular polyurethane produced from the polymer-modified polyether polyamine containing terminal aromatic amino groups produced by the process of claim 2.

* * * * *